A. A. KRAMER.
HOG, SHEEP, AND POULTRY FOUNTAIN.
APPLICATION FILED MAR. 30, 1909.
983,375.
Patented Feb. 7, 1911.
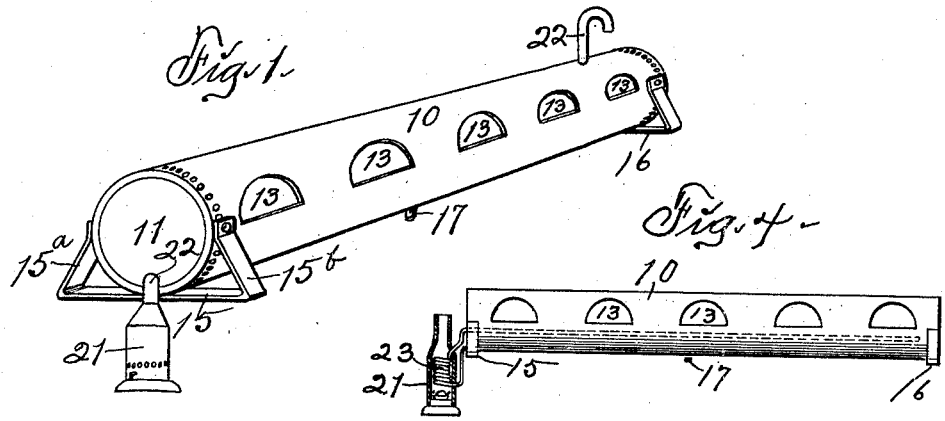
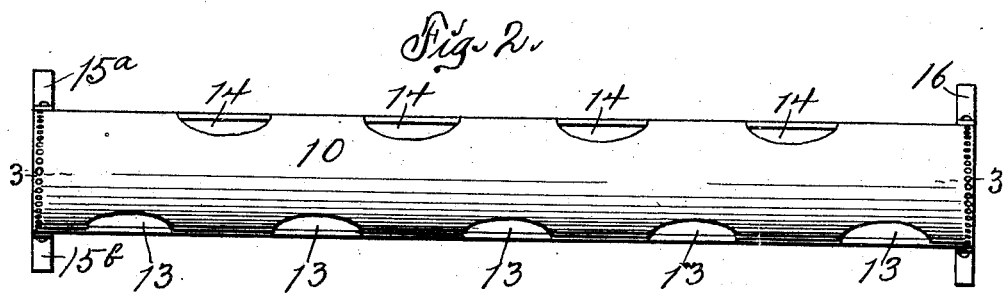
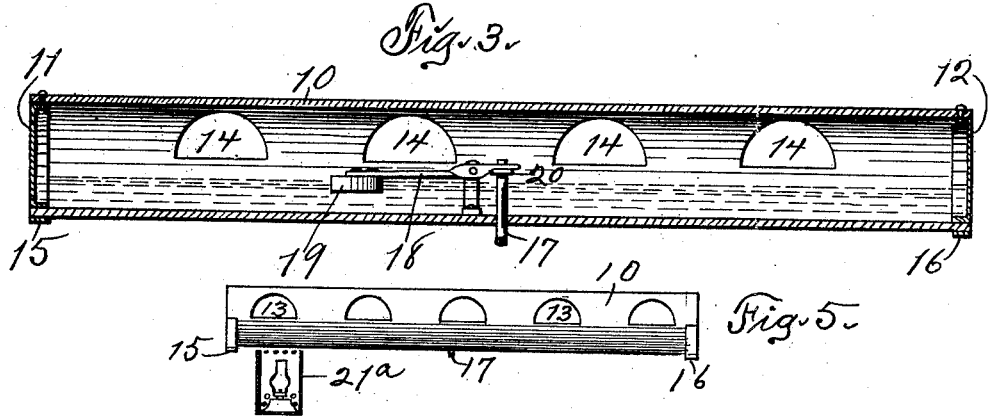

UNITED STATES PATENT OFFICE.

ANDREW A. KRAMER, OF KANSAS CITY, KANSAS.

HOG, SHEEP, AND POULTRY FOUNTAIN.

983,375. Specification of Letters Patent. Patented Feb. 7, 1911.

Application filed March 30, 1909. Serial No. 487,343.

*To all whom it may concern:*

Be it known that I, ANDREW A. KRAMER, a citizen of the United States of America, and resident of Kansas City, Wyandotte county, Kansas, have invented a new and useful Hog, Sheep, and Poultry Fountain, of which the following is a specification.

The object of this invention is to provide an improved construction for hog, sheep and poultry fountain and means for heating the same.

A further object of this invention is to provide improved means for supporting a cylinder in a given position.

A further object of this invention is to provide a stock fountain formed with oppositely arranged rows of drink openings, the openings in one row in staggered relation to the openings in the other row.

A further object of this invention is to simplify and cheapen the construction of hog, sheep and poultry fountains.

My invention consists in the construction, arrangement and combination of elements hereinafter set forth, pointed out in my claims and illustrated by accompanying drawings, in which—

Figure 1 is a perspective illustrating the complete device in position for practical use. Fig. 2 is a plan of the complete device and Fig. 3 is a longitudinal section of the device in the indicated line 3—3 of Fig. 2, the heating means being removed. Figs. 4 and 5 are side elevations of modified forms of the device.

In the construction of the device as shown, the numeral 10 designates the body and 11, 12 the heads or ends of the cylinder, preferably made of sheet metal. The body 10 constitutes an open ended pipe and is formed with a plurality of drink openings 13 in one side (in this instance five in number), and a plurality of drink openings 14 having their lower edges in a line diametrically opposite the lower edge of the row of openings. The drink openings 13 are in staggered relations to the drink openings 14, so that an animal drinking from the tank through an opening 13 cannot be disturbed by an animal drinking from the tank through an opening 14 on the opposite side thereof. The pipe formed by the body 10 is closed and sealed at its ends by the heads 11, 12 mounted therein. Legs or supports 15, 16 are fixed to end portions of the body 10. Each leg or support comprises a base member adapted to rest on a solid surface such as the earth or a floor, integral arms 15ª 15ᵇ forming acute angles with the base portion and fixed at their upper ends to the rim. The length of the base portion of each leg is somewhat greater than the diameter of the cylinder. An ingress pipe 17 connects with the cylinder at any desired point and may head from a source of water supply (not shown). A float lever 18 and a float 19 thereon is fulcrumed within the cylinder and carries a valve 20 seating on the interior open end of the inlet pipe 17 at times. The level of the water within the cylinder is determined at some point below the drink openings 13, 14 by automatic operation of the float lever 18 and valve through the raising and lowering of the float 19 by the water therein.

It will be observed that the drink openings 13, 14 have their lower margins at or near the horizontal diameter of the cylinder, and their upper margins arched above said level, thus providing convenient means for access of a hog or sheep to the water in the tank or cylinder on account of the curved formation of the wall of the cylinder above the drink openings.

A heating device, such as a lamp casing 21, is mounted adjacent to one end of the cylinder 10 and a pipe or conduit 22 leads from said heating device through the lower portion of the head 11, lengthwise, and in the lower portion of the cylinder and vertically from the opposite end of the cylinder. The terminal of the pipe 22 is turned downward so that dirt cannot enter. The pipe 22 leads heat and smoke from the casing 21 and heats the water in the cylinder 10. Any desired heat producer can be mounted in the casing 21. Any desired stove, lamp or heat producing means may be used instead of the casing 21, and communicate with the pipe 22.

In Fig. 4 the lamp or heater casing is shown with a coil 23 therein and communicating at different ends and in different planes with the interior of the trough 10. In this construction water circulates from and to the tank 10 through the coil 23 and is heated in said coil by the lamp or heater in said casing.

In Fig. 5 I show the lamp casing 21ª beneath and with its open upper end in contact with one end of the trough 10. A lamp or heater of any desired form may be mounted in the casing 21ª, and heat passing upward therefrom will warm the water in the trough.

I claim as my invention—

1. A hog, sheep and poultry fountain, comprising a recumbent cylinder formed with semi-circular openings on opposite sides, the openings on one side being in staggered relations to the openings on the other side, said openings having their lower edges in a common horizontal plane on diametrically opposite sides of the cylinder, an inlet pipe entering the central portion of the bottom of the cylinder, and a float-controlled valve within the cylinder and engaging the upper end of said pipe.

2. A hog, sheep and poultry fountain, comprising a recumbent cylinder formed with semi-circular openings on opposite sides, the openings on one side being in staggered relations to the openings on the other side, said openings having their lower edges in a common horizontal plane on diametrically opposite sides of the cylinder, an inlet pipe entering the central portion of the bottom of the cylinder, a float controlled valve within the cylinder and engaging the upper end of said pipe, a conduit 22 mounted through the lower portion of one end of the cylinder, said conduit extending lengthwise of and within the cylinder, and leading through the top of the opposite end portion of said cylinder, and a heater located wholly outside the cylinder and communicating with the initial end portion of said conduit.

Signed by me at Kansas City, Missouri, this sixth day of November 1908.

ANDREW A. KRAMER.

Witnesses:
B. A. RAGAN,
A. L. BOUDIN.